United States Patent [19]

Strong

[11] 4,061,721
[45] Dec. 6, 1977

[54] HYDROGEN PEROXIDE STABILIZATION WITH PHENYLPHOSPHONIC ACIDS

[75] Inventor: W. Albert Strong, Wadsworth, Ohio

[73] Assignee: PPG Industries, Inc., Pittsburgh, Pa.

[21] Appl. No.: 636,322

[22] Filed: Nov. 28, 1975

[51] Int. Cl.$^2$ .................................... C01B 15/02
[52] U.S. Cl. .................................... 423/272; 423/584
[58] Field of Search ............ 423/272, 273, 584; 260/502.4 R; 252/186

[56] References Cited

U.S. PATENT DOCUMENTS

| | | | |
|---|---|---|---|
| 2,230,371 | 2/1941 | Bolton | 252/49.9 |
| 2,871,101 | 1/1959 | Rust et al. | 423/272 |
| 3,122,417 | 2/1964 | Blaser et al. | 423/272 |
| 3,387,939 | 6/1968 | Reilly et al. | 423/273 |
| 3,781,409 | 12/1973 | Munday et al. | 423/273 |

Primary Examiner—Earl C. Thomas
Assistant Examiner—Wayne A. Langel
Attorney, Agent, or Firm—William M. Dooley; Irwin M. Stein

[57] ABSTRACT

Aqueous hydrogen peroxide solutions are stabilized with the use of phenylphosphonic acids or salts thereof, preferably in combination with known stabilizer additives: stannates, nitrates, and pyrophosphates.

10 Claims, No Drawings

HYDROGEN PEROXIDE STABILIZATION WITH PHENYLPHOSPHONIC ACIDS

BACKGROUND OF THE INVENTION

1. Field of the Invention

This invention relates to the use of phenylphosphonic acids and salts thereof to stabilize aqueous hydrogen peroxide solutions.

2. Description of the Prior Art

Dilute aqueous hydrogen peroxide in concentrations of from about 3 to about 10 weight percent has many uses, including bleaching, hair dyeing and waving, processing of photographs for permanence, and preparation of cosmetics and mild antiseptics.

Hydrogen peroxide is sold in concentrated aqueous solutions of between about 30 and 90 weight percent, which are ofted diluted by the purchaser for use or sale. The concentrated solutions are quite stable when pure, but contaminants which promote decomposition may be introduced in storage and handling. The common use of tap water for dilution of the concentrate may introduce significant quantities of decomposition-inducing cations such as iron, copper, and manganese cations. If the diluted solutions are stored rather than used immediately, substantial decomposition may occur.

Numerous organic and inorganic stabilizers for aqueous hydrogen peroxide are known. Various combinations of stannate, nitrate, orthophosphate, and pyrophosphate ions for use at varying pH have been proposed. See, for example, U.S. Pat. Nos. 3,701,825, 3,373,113, 3,591,341, and 3,607,053. U.S. Pat. No. 3,687,627 shows the use of alkylidene diphosphonic acids in aqueous hydrogen peroxide in combination with stannate and magnesium ions.

U.S. Pat. No. 2,230,371 discloses phosphonic acids, including phenylphosphonic acid, are useful in stabilizing organic substances such as gasoline, fats, oils, and cotton against copper-promoted oxidation.

U.S. Pat. No. 3,781,409 describes aqueous hydrogen peroxide solutions stabilized with water-soluble tin compounds, preferably in combination with a complexing agent such as a phosphonic acid. Specific phosphonic acids mentioned are hydroxyethylidene diphosphonic acids, nitrilo tri(methylenephosphonic acid), ethylenediamine tetra(methylphosphonic acid), and alkali metal, ammonium, substituted ammonium, magnesium, and other salts thereof.

Other U.S. patents which disclose the use of alkylidene diphosphonic acid, amino tri(alkylidenephosphonic acid), and ethylenediamine tetra(alkylidenephosphonic acid) compounds to stabilize aqueous hydrogen peroxide are U.S. Pat. Nos. 3,122,417, 3,701,825, 3,681,022, and 3,903,244.

SUMMARY OF THE INVENTION

It has now been found that aqueous hydrogen peroxide solutions may be stabilized effectively against decomposition by incorporating therein a minor stabilizing concentration of phenylphosphonic acid or an alkali metal or ammonium salt thereof. The stabilizer may be used alone or, preferably, in combination with known stabilizing additives, notably stannates. More preferably, the stabilizer is used in combination with stannates, nitrates, and pyrophosphates.

DETAILED DESCRIPTION OF THE INVENTION

In accordance with this invention, aqueous hydrogen peroxide solutions are stabilized by incorporating therein minor stabilizing concentration of phenylphosphonic acid, or an alkali metal or ammonium salt thereof, such as sodium phenylphosphonate, disodium phenylphosphonate, or ammonium phenylphosphonate.

It is expected that soluble substituted phenylphosphonic acids will also be useful, particularly phenylphosphonic acids having 1 to 3 lower alkyl ($C_1$-$C_4$) substituents, such as 4-methylphenylphosphonic acid, 4-t-butylphenylphosphonic acid, 2,4-diethylphenylphosphonic acid, 2,4,6-trimethylphenylphosphonic acid, and alkali metal and ammonium salts thereof. Because the amount of stabilizer to be used is related to the concentration of peroxide, the more heavily substituted compounds may not be sufficiently soluble for use in highly concentrated peroxide solutions, but are expected to be soluble in a stabilizing amount suitable for the more dilute peroxide solutions.

The phenylphosphonic acid stabilizers may be represented by the formula:

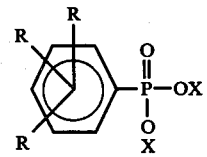

having 1 to 4 carbons, wherein each R independently is hydrogen or a lower alkyl group such as methyl, ethyl, isopropyl, and n-butyl, each X independently is hydrogen, an ammonium cation, or an alkali metal cation, particularly a sodium or potassium cation. The stabilizer must be soluble in a minor stabilizing concentration in the aqueous hydrogen peroxide to be stabilized.

The phenylphosphonic acid stabilizers herein contemplated may be included in widely varying concentrations in aqueous hydrogen peroxide solutions of any substantial concentration, i.e., between about 3 and 90 weight percent, to protect the hydrogen peroxide from decomposition, particularly to inhibit decomposition induced by polyvalent metal cation contaminants. The preferred stabilizer concentration depends upon the amount of contamination anticipated. Where a hydrogen peroxide solution is to be stabilized, for example, against contaminant cations introduced in handling or by dilution with tap water, a useful stabilizer concentration will usually be between about 0.01 and 2.0 weight percent, more preferably between about 0.05 and 0.5 weight percent by weight of hydrogen peroxide. Amounts of more than about 2.0 weight percent may be used, but do not appear to have advantage over lower amounts.

Stabilized hydrogen peroxide solutions of any substantial hydrogen peroxide concentrations may be prepared. Thus, aqueous hydrogen peroxide solutions of between about 3 and 90 weight percent hydrogen peroxide may be stabilized in accordance with this invention. Especially useful are about 30 to 50 weight percent solutions, which may be shipped conveniently and then diluted by the user to a desired concentration, typically about 3 to 10 weight percent.

The stabilized solutions are kept acidic, with a pH usually between about 3 and 6, preferably between about 3 and 4.5, as measured with a glass electrode. If the stabilized solution is diluted, especially if the diluted solution is to be stored for a time, it is desirable to adjust the pH to from about 3 to about 4.5. The pH of a stabilized solution may be lowered by the addition of orthophosphoric acid, nitric acid, or another organic or inorganic acid inert to hydrogen peroxide. The pH may be raised by the addition of sodium hydroxide, sodium carbonate, trisodium phosphate, or another alkaline material inert to hydrogen peroxide.

It is highly preferred to use the stabilizers of this invention in combination with stannate compounds in stabilized aqueous hydrogen peroxide. More preferably, the stabilizers are used in combination with stannates, nitrates, and pyrophosphates.

Useful stannate compounds include ammonium and alkali metal stannates such as potassium stannate, sodium stannate, and ammonium stannate. Sodium stannate trihydrate is preferred. The stannate compound may be used in an amount of between about 0.001 and 1.0 weight percent or more (calculated as sodium stannate trihydrate), usually from about 0.01 to about 0.5 weight percent by weight of hydrogen peroxide in the stabilized solution. When a stannate compound is used, it should be added to the hydrogen peroxide solution before other additives in order to avoid difficulty in dissolving the stannate.

The presence of nitrate ion in aqueous hydrogen peroxide solution inhibits corrosion of the aluminum vessels in which the solutions are manufactured and stored. Sources of nitrate ion include nitric acid, alkali metal nitrates such as sodium nitrate, and ammonium nitrate. The amount of nitrate used may be between about 0.001 weight percent and 1.0 weight percent or more (calculated as ammonium nitrate), usually from about 0.01 to about 0.5 weight percent by weight of hydrogen peroxide.

Inorganic phosphate, i.e., orthophosphate, or pyrophosphate, may also be included in hydrogen peroxide solutions stabilized according to this invention. Sources of inorganic phosphate include orthophosphoric acid, pyrophosphoric acid, and their alkali metal and ammonium salts, such as disodium hydrogen phosphate, disodium dihydrogen pyrophosphate, tetrasodium pyrophosphate, and ammonium dihydrogen phosphate. The inorganic phosphate may be used in amounts of from about 0.001 to about 2.0 weight percent or more (calculated as disodium dihydrogen pyrophosphate), preferably from about 0.005 to about 0.75 weight percent by weight of hydrogen peroxide. Pyrophosphate is preferred.

Especially desirable stabilized aqueous hydrogen peroxide solutions contain between about 0.25 and 0.35 weight percent, by weight of hydrogen peroxide, of a phenylphosphonic acid stabilizer, between about 0.05 and 0.08 weight percent nitrate calculated as ammonium nitrate, between about 0.12 and 0.16 weight percent stannate calculated as sodium stannate trihydrate, and between about 0.10 and 0.18 weight percent pyrophosphate calculated as disodium dihydrogen phosphate, at a pH between about 3.0 and 4.0, and a hydrogen peroxide concentration between about 30 and 70 weight percent.

The stabilizers of this invention may be premixed with other stabilizer additives before addition to the hydrogen peroxide solution, if desired, but premixing with stannate may lead to the formation of precipitates and to a moderate loss of effectiveness.

The following examples illustrate how the present invention may be practiced. In Example I stabilized hydrogen peroxide solutions of about 35 weight percent concentration were prepared, portions were diluted to about 6 weight percent, and portions of the 6 percent solutions were treated with a contaminant cation solution. Then portions of the 35 percent, 6 percent, and contaminated 6 percent solutions were tested for stability.

The contaminant cation solution was prepared from aqueous solutions of of $AlK(SO_4)_2 \cdot 12H_2O$, $FeNH_4(SO_4)_2$, $CuSO_4$, $MnSO_4$, and $K_2CrO_4$. In each case, sufficient of this solution was added to the 6 weight percent hydrogen peroxide test solution to provide the following concentrations of ions in each such test solution:

$Al^{+++}$; 0.25 milligrams/liter
$Fe^{+++}$; 0.25 milligrams/liter
$Cu^{++}$; 0.05 milligrams/liter
$Mn^{++}$; 0.025 milligrams/liter
$Cr^{++++++}$; 0.012 milligrams/liter Stability of tested solutions was measured by the $S_{100}$ test. This test is performed by placing a weighed sample of test solution, about 45 milliliters, in a 50 milliliter volumetric-type flask having an extra-long neck. The body of the flask is then immersed up to the neck in water at 100° C. for 24 hours, with the mouth of the flask lightly covered but not sealed. The flask neck, which extends above the heat bath, serves as a condenser to minimize loss of water from the test solution. After 24 hours, the weight of test solution remaining in the flask is determined and expressed as a percentage of the initial weight. This percentage is the $S_{100}$ value. A high $S_{100}$ value corresponds to a low loss of oxygen from the solution and therefore to high stability of the hydrogen peroxide.

EXAMPLE I

Stabilized aqueous 35 weight percent hydrogen peroxide solutions were prepared containing 0.28 percent, by weight of hydrogen peroxide, of stabilizer, 0.064 weight percent ammonium nitrate, and 0.14 weight percent sodium stannate trihydrate. A portion of each stabilized solution was diluted to about 6 weight percent hydrogen peroxide using distilled water. A portion of each 6 percent solution was then treated with the contaminant cation solution to provide the above-specified concentrations of cations. The pH of all solutions was adjusted to 3.5 with dilute nitric acid or sodium hydroxide as required. A portion of each solution was tested for stability by the $S_{100}$ test.

TABLE I

| Stabilizer | | Test Solution | | |
| --- | --- | --- | --- | --- |
| | | Concentrated | Diluted | Diluted, Contaminated |
| Phenylphosphonic acid | Assay, % | 35.43 | 6.37 | 6.43 |
| | $S_{100}$, % | 98.9 | 98.5 | 93.2 |
| Phenylphosphonic acid | Assay, % | — | — | 5.96 |
| | $S_{100}$, % | | | 95.9 |
| Disodium dihydrogen | Assay, % | 35.67 | 6.02, 6.03 | 5.88, 5.92 |
| pyrophosphate | $S_{100}$, % | 98.9 | 97.6, 95.1 | 82.7, 75.2 |

TABLE I-continued

| Stabilizer | | Test Solution | | |
|---|---|---|---|---|
| | | Concentrated | Diluted | Diluted, Contaminated |
| Hydroxyethylidene- | Assay, % | 35.32 | 5.84 | 5.71 |
| diphosphonic acid | $S_{100}$, % | 98.4 | 100 | 87.5 |
| Nitrilo tri(methylene- | Assay, % | 35.83 | 6.11 | 6.14 |
| phosphonic acid) | $S_{100}$, % | 98.7 | 99.3 | 95.5 |
| Ethylenediamine tetra | Assay, % | 35.88 | 6.06 | 5.97 |
| ethylenephosphonic acid) | $S_{100}$, % | 98.9 | 98.4 | 89.6 |

The data in Table I demonstrate that phenylphosphonic acid is a highly effective stabilizer, comparing favorably with three known stabilizers disclosed in the cited patents.

EXAMPLE II

A stabilized 35 weight percent hydrogen solution was prepared containing 0.28 weight percent phenylphosphonic acid, 0.064 weight percent ammonium nitrate, and 0.14 weight percent sodium stannate trihydrate, by weight of hydrogen peroxide. A strip of 1060 aluminum about 10 by 2.5 by 0.3 centimeters having a welded bead of 1260 aluminum was partially immersed, to a point just above the weld bead, in 100 milliliters of the stabilized solution in a glass bottle. A control without aluminum strip was also prepared. The bottles were covered with plastic film, capped loosely, and stored in an oven at 40° C. for 5 weeks and then 45° C. for 6 weeks. At the end of the 11 weeks, the portion of the aluminum strip that had been above the surface of the solution was unchaged; the portion that had been below the surface was slightly dulled. The pH of the test solution rose from 3.5 to 4.0 and its weight decreased by 8.5 percent. The pH of the control fell from 3.5 to 3.3 and its weight decreased by 5.0 percent. The test solution also contained a small amount of a fine white flocculent precipitate.

EXAMPLE III

In a hard water stability test, a solution was prepared containing 0.28 weight percent phenylphosphonic acid, 0.064 weight percent ammonium nitrate, and 0.14 weight percent sodium stannate trihydrate, by weight of hydrogen peroxide. Calcium chloride was added to provide 100 parts per million in the test solution. The clear, treated solution was allowed to stand overnight at room temperature and was then heated at about 50° C. overnight. The solution remained clear, showing stability in hard water, and its pH remained unchanged at 3.5.

Although the present invention has been described with reference to specific embodiments and particular details, the specifics are not intended to limit the invention except insofar as they appear in the following claims.

I claim:

1. A stabilized aqueous hydrogen peroxide solution containing a minor stabilizing concentration, sufficient to inhibit decomposition of hydrogen peroxide induced by polyvalent metal cation contamination, of soluble stabilizer selected from the group consisting of phenylphosphonic acids having 0 to 3 lower alkyl substituents on the phenyl group, and alkali metal and ammonium salts thereof.

2. The hydrogen peroxide solution of claim 1 wherein the stabilizer is phenylphosphonic acid.

3. The hydrogen peroxide solution of claim 2 having between about 30 and 50 weight percent hydrogen peroxide.

4. The hydrogen peroxide solution of claim 1, containing between about 0.01 and 2.0 percent by weight of hydrogen peroxide of said soluble stabilizer and between about 0.001 and 1.0 percent by weight of hydrogen peroxide, calculated as sodium stannate trihydrate, of alkali metal or ammonium stannate.

5. The hydrogen peroxide solution of claim 4, further containing between about 0.001 and 1.0 percent by weight of hydrogen peroxide, calculated as ammonium nitrate, of nitric acid or alkali metal or ammonium nitrate, and between about 0.001 and 2.0 percent by weight of hydrogen peroxide, calculated as disodium dihydrogen pyrophosphate, of pyrophosphoric acid or alkali metal or ammonium pyrophosphate.

6. A method of stabilizing aqueous hydrogen peroxide which comprises:
 adding to an aqueous hydrogen peroxide solution a minor stabilizing amount, sufficient to inhibit decomposition of hydrogen peroxide induced by polyvalent metal cation contamination, of soluble stabilizer selected from the group consisting of phenylphosphonic acids having 0 to 3 lower alkyl substituents on the phenyl group, and alkali metal and ammonium salts thereof.

7. The method of claim 6 wherein the stabilizer is phenylphosphonic acid.

8. The method of claim 7 wherein the solution has between about 30 and 50 weight percent hydrogen peroxide.

9. The method of claim 6, which further comprises adding between about 0.001 and 2.0 percent by weight of hydrogen peroxide of said soluble stabilizer and between about 0.001 and 1.0 percent by weight of hydrogen peroxide, calculated as sodium stannate trihydrate, of alkali metal or ammonium stannate.

10. The method of claim 9, which further comprises adding between about 0.001 and 1.0 percent by weight of hydrogen peroxide, calculated as ammonium nitrate, of nitric acid or alkali metal or ammonium nitrate, and between about 0.001 and 2.0 percent by weight of hydrogen peroxide, calculated as disodium dihydrogen pyrophosphate, of pyrophosphoric acid or alkali metal or ammonium pyrophosphate.

* * * * *

UNITED STATES PATENT AND TRADEMARK OFFICE
CERTIFICATE OF CORRECTION

PATENT NO. : 4,061,721

DATED : December 6, 1977

INVENTOR(S) : W. Albert Strong

It is certified that error appears in the above-identified patent and that said Letters Patent are hereby corrected as shown below:

Column 6, claim 9 line 2 "0.001" should read --0.01--

Signed and Sealed this

Ninth Day of May 1978

[SEAL]

Attest:

RUTH C. MASON
Attesting Officer

LUTRELLE F. PARKER
Acting Commissioner of Patents and Trademarks